United States Patent
Akuta (10) Patent No.: US 8,523,604 B2
(45) Date of Patent: Sep. 3, 2013

(54) TERMINAL BLOCK AND TERMINAL BLOCK MANUFACTURING METHOD

(75) Inventor: Daisuke Akuta, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 67 days.

(21) Appl. No.: 13/293,585

(22) Filed: Nov. 10, 2011

(65) Prior Publication Data
US 2012/0186872 A1 Jul. 26, 2012

(30) Foreign Application Priority Data

Jan. 20, 2011 (JP) ................................. 2011-010033

(51) Int. Cl.
*H01R 11/00* (2006.01)
(52) U.S. Cl.
USPC ......................................................... 439/502
(58) Field of Classification Search
USPC ................. 439/502, 722, 719, 709, 717, 718, 439/810; 29/848; 361/695, 719; 301/58
See application file for complete search history.

(56) References Cited

U.S. PATENT DOCUMENTS

| 4,630,882 A | * | 12/1986 | Naylor et al. ................. 439/444 |
| 5,203,724 A | * | 4/1993 | Casey ........................... 439/792 |
| 6,185,811 B1 | * | 2/2001 | Perry .............................. 29/606 |
| 2004/0251687 A1 | | 12/2004 | Chelchowski et al. | |

FOREIGN PATENT DOCUMENTS

| JP | 11-144783 | 5/1999 |
| JP | 2008-098007 | 4/2008 |

* cited by examiner

*Primary Examiner* — R S Luebke
*Assistant Examiner* — Harshad Patel
(74) *Attorney, Agent, or Firm* — Gerald E. Hespos; Michael J. Porco; Matthew T. Hespos (57) ABSTRACT

A terminal block has conductors extending from devices placed one over another placed on nuts (10) and fastened by a bolt. A heat sink (40) is arranged below the nuts and an insulating plate (20) is sandwiched in close contact with the nuts (10) and the heat sink (40). A molded resin part (60) covers these three members (10, 20 and 40). The insulating plate (20) includes nut accommodating portions (21) capable of accommodating the nuts (10) and bolt escaping recesses (26) projecting downward from a bottom plate (22) of the insulating plate (20). The heat sink (40) includes accommodation recesses (43) into which the bolt escaping recesses (26) fit. The molded resin part (60) is molded with the nuts (10) accommodated in the nut accommodating portions (21) and the accommodation recesses (43) and the bolt escaping recesses (26) fit to each other.

17 Claims, 13 Drawing Sheets

TERMINAL BLOCK AND TERMINAL BLOCK MANUFACTURING METHOD

BACKGROUND OF THE INVENTION

1. Field of the Invention

The invention relates to a terminal block and a terminal block manufacturing method.

2. Description of the Related Art

Japanese Unexamined Patent Publication No. H11-144783 discloses a terminal block for electrically connecting conductors, such as busbars, extending from devices, such as a motor and an inverter. The terminal block has a main body with metal nuts insert molded therein. The conductors of the respective devices are placed one above another on the nuts and are connected electrically and fastened by tightening bolts into the nuts.

However, heat produced from one device is transferred to the other device via the terminal block. Further, heat produced from the device is transferred to the nut from the conductor and remains inside the terminal block.

Japanese Unexamined Patent Publication No. 2008-98007 discloses a terminal block with a metal heat sink and an insulation sheet below the nuts and in an integral array of resin. Thus, heat transferred from the conductor to the nut is transferred to the heat sink via the insulation sheet and radiated from the heat sink. Accordingly, a heat transfer from one device to the other can be restricted.

However, the terminal block of Japanese Unexamined Patent Publication No. 2008-98007 has no means for positioning the heat sink, the insulation sheet and the nuts when integrally forming the respective members by resin. Positioning pins are provided for positioning the nuts during molding. However, there is no means for positioning the nuts at predetermined positions with respect to the mold and the nuts cannot be mounted on the positioning pins. Further, an insulating property between the nuts and the heat sink in the terminal block after resin molding can be reduced if the insulation sheet is displaced relative to the heat sink and the nuts.

The invention was completed in view of the above situation and an object thereof is to prevent displacements of respective members and, hence, ensure an insulating property between nuts and a heat sink.

SUMMARY OF THE INVENTION

The invention relates to a terminal block in which conductors extending from devices are placed one over another and fastened by at least one bolt. The terminal block has at least one nut with upper and lower surfaces. The conductors are placed on the upper surface of the nut and at least one heat sink is arranged below the lower surface of the nut. At least one insulating plate is sandwiched vertically while being held in close contact with the nut and the heat sink. A molded resin part integrally surrounds at least parts of the nut, the insulating plate and the heat sink. A first positioning means is provided for positioning the nut and the insulating plate with respect to each other during molding and a second positioning means is provided for positioning the insulating plate and the heat sink with respect to each other during molding. The first and second positioning means of the above-described terminal block prevent the molded resin part from being molded with the insulating plate displaced. Thus, the nut, the heat sink and the insulating plate are held in close contact at correct positions and ensure an insulating property between the nut and the heat sink.

The insulating plate may include at least one nut accommodating portion for at least partly accommodating the nut. The first positioning means may be formed by at least partly accommodating the nut in the nut accommodating portion.

The nut and the insulating plate can be positioned with respect to each other by at least partly accommodating the nut into the nut accommodating portion.

The nut accommodating portion may include a bottom plate vertically sandwiched while being held in close contact with the nut and the heat sink. At least one surrounding wall may stand up from the bottom plate to at least partly surround one or more side surfaces of the nut.

One or more vertical positioning ribs may be provided on the inner surface of the surrounding wall and can contact the side surfaces of the nut.

The positioning ribs can position the nut accurately. Further, the nut can contact only the positioning ribs so that clearances can be formed between the nut and the surrounding wall. Molding resin can flow easily flow into the clearances between the nut and the surrounding wall of the insulating plate in integrally forming the nut and the insulating plate by the molding resin. This makes it possible to improve fixing strength of the molding resin to the nut and the insulating plate and also fixes the nut and the insulating plate without any chance of backlash.

The positioning ribs may be configured to reinforce the surrounding wall over the substantially entire height. Thus, resin pressure generated when integrally forming resin around the nut and the insulating plate will not incline the surrounding wall toward the nut. Further, the reinforcement provided by the ribs maintains the clearances between the nut and the surrounding wall. Thus, resin can flow into and fill up the clearances.

The inner peripheral shape of the surrounding wall may substantially conform to the outer peripheral shape of the nut.

The heat sink may include an accommodation recess to receive a projection provided on the lower surface of the insulating plate. The second positioning means may be formed by at least partly fitting the projection of the insulating plate into the accommodation recess of the heat sink.

The projection of the insulating plate may be formed by at least one bolt escaping structure that projects down from the insulating plate and has a recess on an upper side substantially coaxially with a bolt tightening hole in the nut. The recess of the bolt escaping structure receives a bolt screwed into the nut. The downwardly projecting side of the bolt escaping structure can fit into the accommodation recess of the heat sink to position the insulating plate with respect to the heat sink. Thus, the bolt escaping structure doubles as the second positioning means. Further, the accommodation of the bolt escaping structure in the accommodation recess of the heat sink reduces a height between the insulating plate and the heat sink as compared with the case where the bolt escaping recess is not accommodated in the heat sink.

Plural nuts may be accommodated in the nut accommodating portion; and a part of the surrounding wall between adjacent nuts defines a partition wall that partitions adjacent nuts. Thus, a long creepage distance exists between the respective nuts to improve an insulating property between the nuts.

The partition wall may be higher than the conductors placed on the nuts. More particularly, a height of the partition wall may be at least about 1.5 times the height of outer surrounding walls standing up from the bottom plate of the nut accommodating portion.

The insulating plate may have plural nut accommodating portions for accommodating plural nuts and one unitary bottom plate common to all of the nut accommodating portions may be provided. Both upper and lower surfaces of the bottom plate preferably are formed to be flat.

These and other objects, features and advantages of the invention will become more apparent upon reading the following detailed description of preferred embodiments and accompanying drawings. It should be understood that even though embodiments are described separately, single features thereof may be combined to additional embodiments.

DETAILED DESCRIPTION OF THE PREFERRED EMBODIMENTS

A terminal block in accordance with the invention is to be mounted in a motor case to be installed in a vehicle such as an electric vehicle or a hybrid vehicle and is provided to electrically connect a busbar of a first electric equipment such as an electric motor (e.g. a three-pole busbar provided in a three-phase alternating current motor) and a busbar of a second electric equipment such as an inverter (e.g. a three-pole busbar provided in an inverter).

Figure 2:
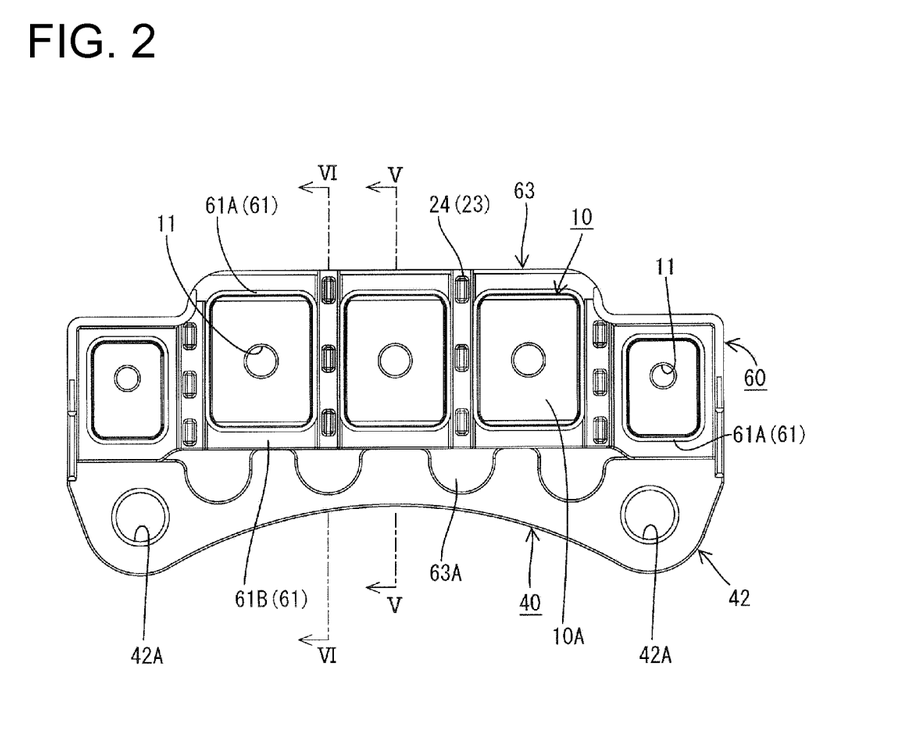
FIG. 2 is a plan view of the terminal block.

The terminal block includes nuts 10 with upper and lower surfaces. Unillustrated busbars extending from electrical devices are to be placed on the upper surfaces of the nuts 10 and a heat sink 40 is arranged adjacent to the lower surfaces of the nuts 10. An insulating plate 20 is sandwiched between the nuts 10 and the heat sink 40. A molded resin part 60 made e.g. of synthetic resin at least partly covers the nuts 10, the insulating plate 20 and the heat sink 40. In the following description, a vertical direction is based on a vertical direction in FIG. 5 and a lateral direction is based on a lateral direction in FIG. 2.

Figure 7:
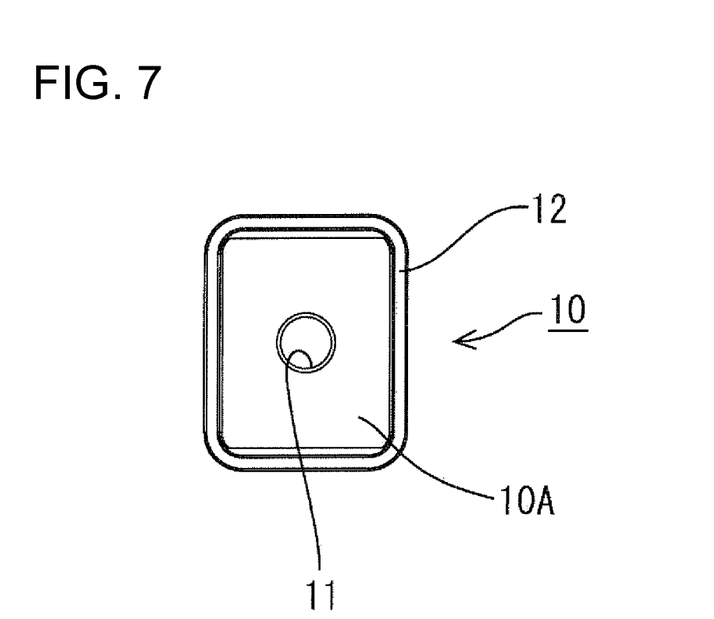
FIG. 7 is a plan view of a nut.
Figure 13:
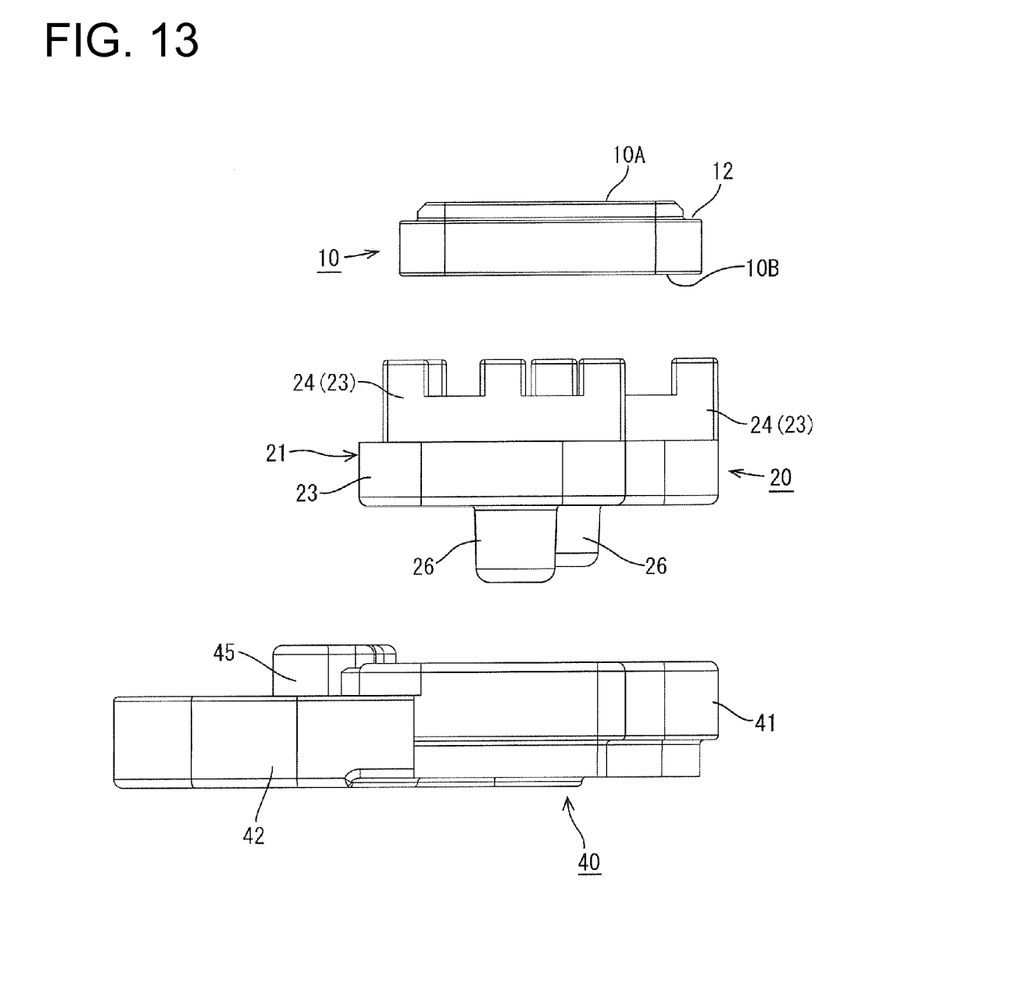
FIG. 13 is a side view showing a state before the nuts, the insulating plate and the heat sink are assembled.

Each nut 10 is a substantially rectangular metal block with rounded corners, as shown in FIGS. 7 and 13, and has upper and lower fastening surfaces 10A and 10B. A bolt tightening hole 11 penetrates a central part of each nut 10 in a vertical direction that is perpendicular to both fastening surfaces 10A, 10B. Unillustrated busbars are placed on the upper fastening surface 10A of the nut 10 and an unillustrated bolt then is screwed into the bolt tightening hole 11 for electrically conductively connecting the busbars.

Figure 5:
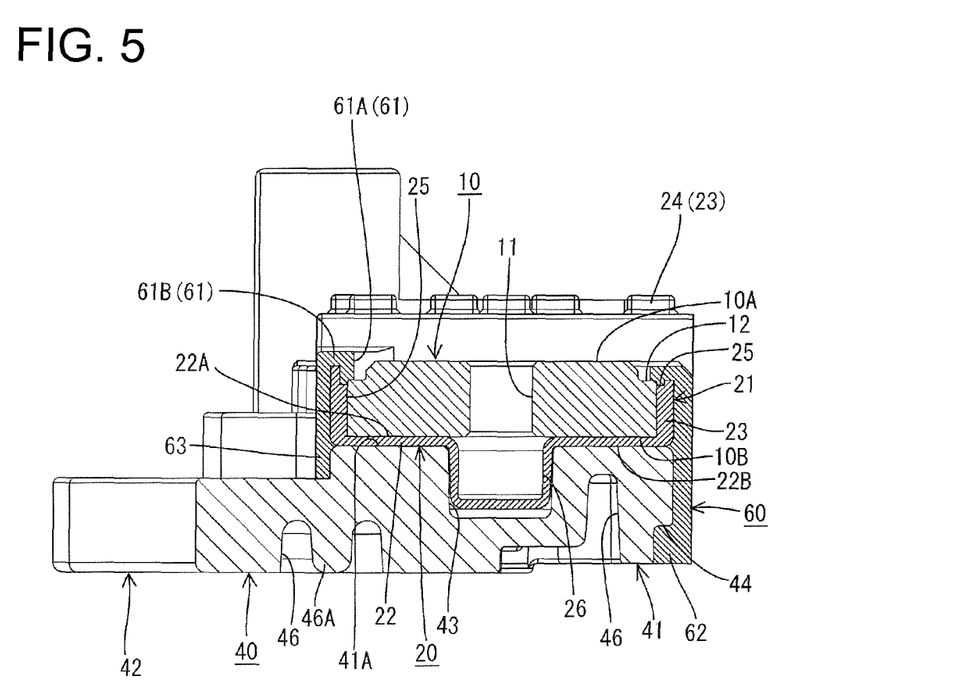
FIG. 5 is a section along V-V of FIG. 2.

A step 12 is formed on the outer peripheral edge of an upper end of the nut 10. This step 12 is formed to be slightly lower than the upper fastening surface 10A of the nut 10, as shown in FIG. 5. The step 12 is provided over substantially the entire outer peripheral edge of the nut 10 and is parallel to the upper and lower fastening surfaces 10A, 10B of the nut 10. Note that the upper and lower fastening surfaces 10A, 10B and the step 12 of the nut 10 are flat without irregularity.

Figure 8:
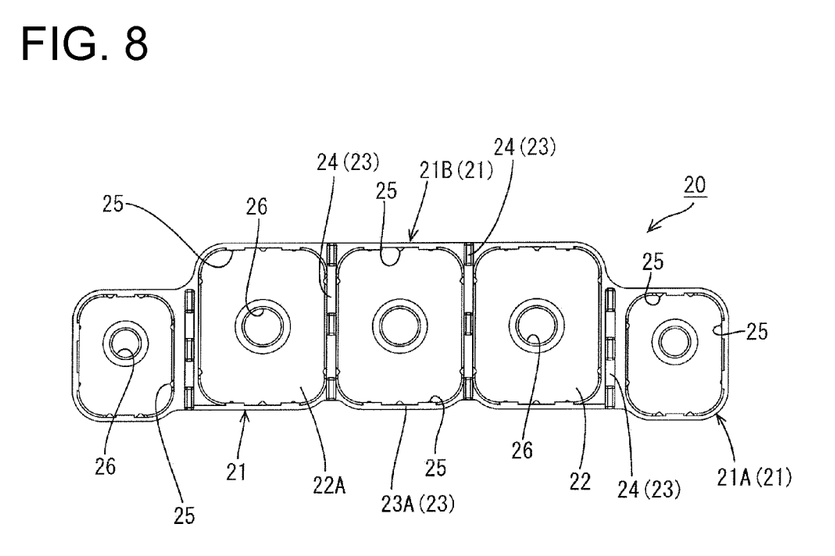
FIG. 8 is a plan view of an insulating plate.

The insulating plate 20 is made of an insulating material such, as synthetic resin, and, is long in the lateral direction, as shown in FIG. 8. The insulating plate 20 functions to transfer heat of the busbars placed on the nuts 10 from the nuts 10 to the heat sink 40 located below the nuts 10. Note that the synthetic resin preferably has a content of glass and talc of between about 50% and 75% (e.g. about 66%). Thus, warping is less likely to occur after molding and thermal conductivity is high as compared to synthetic resin having a content of glass and talc of about 33%. This enables heat to be transferred efficiently from the nuts 10 to the heat sink 40.

Nut accommodating portions 21 are arranged substantially side by side in the lateral direction of the insulating plate 20 and are capable of accommodating the respective nuts 10. The nut accommodating portions 21 function as first positioning means for accommodating the nuts 10.

As shown in FIG. 5, each nut accommodating portion 21 includes a bottom plate 22 for closely contacting the lower fastening surface 10B of the nut 10 and a surrounding wall 23 that projects up from the bottom plate 22 to surround side surfaces of the nut 10 over substantially the entire periphery. Accordingly, the nut accommodating portion 21 has an open upper end with a rectangular shape having rounded corners. Further, as shown in FIG. 8, the respective nut accommodating portions 21 are formed substantially side by side so that longer sides are adjacent to each other. The nut accommodating portions 21 located at the opposite sides in the lateral direction are smaller nut accommodating portions 21A and larger nut accommodating portions 21B are located in a central or intermediate part.

Figure 10:
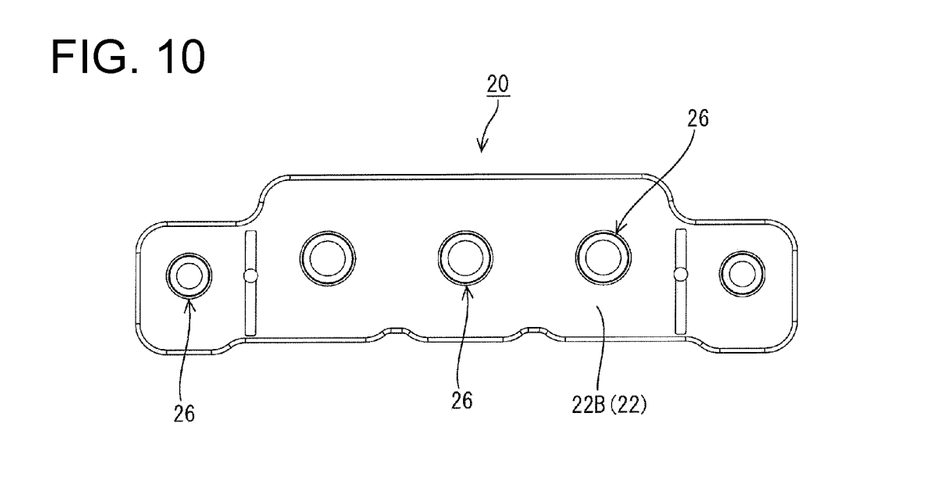
FIG. 10 is a bottom view of the insulating plate.

A single unitary bottom plate 22 is provided for all of the nut accommodating portions 21, as shown in FIG. 10, and has flat upper and lower surfaces 22A, 22B. Thus, the upper surface 22A of the bottom plate 22 can close contact the lower fastening surfaces 10B of the nuts 10 in the nut accommodating portions 21, as shown in FIG. 5, without any clearances between the nuts 10 and the bottom plate 22. In this way, heat can be transferred efficiently from the nuts 10 to the bottom plate 22.

Figure 14:
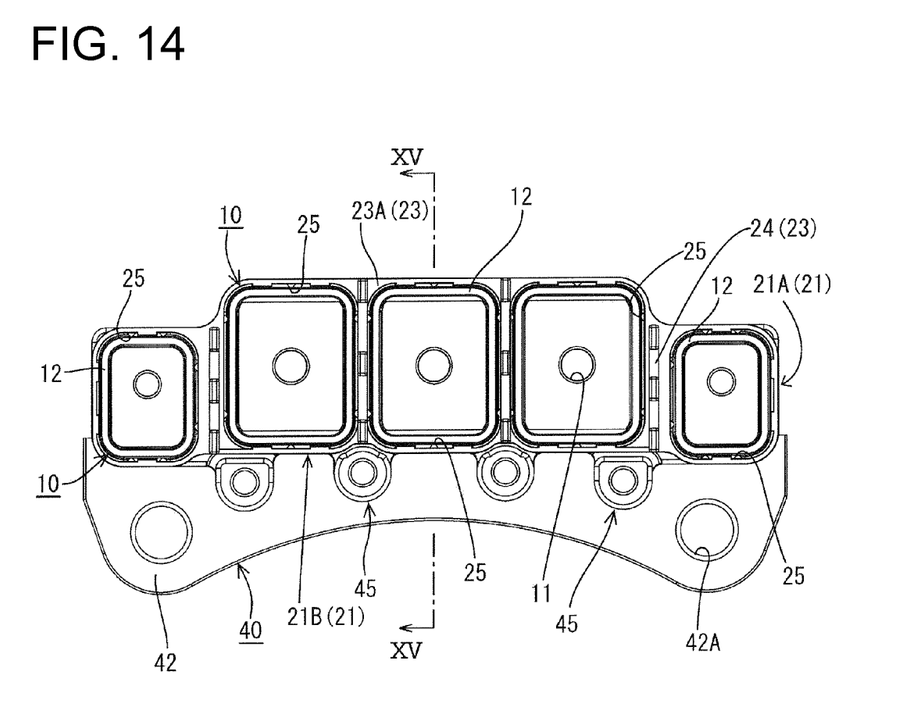
FIG. 14 is a plan view of the assembled nuts, insulating plate and heat sink.

As shown in FIG. 8, the inner peripheral surfaces of the surrounding walls 23 are substantially rectangular and substantially conform to the outer peripheral shapes of the nuts 10. Further, the inner peripheral surfaces of the surrounding walls 23 are slightly larger than the outer peripheral surfaces of the nuts 10, so that small clearances exist between the inner peripheral surfaces of the surrounding walls 23 and the side surfaces of the nut 10 when the nuts 10 are accommodated in the nut accommodating portions 21 as shown in FIG. 14.

Figure 9:
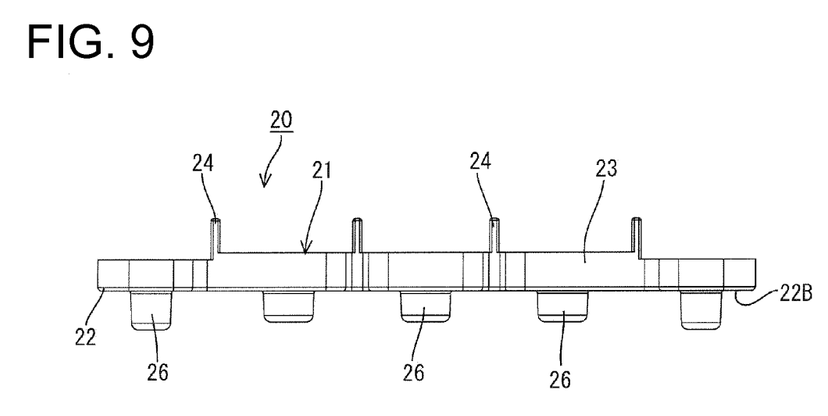
FIG. 9 is a rear view of the insulating plate.

The surrounding wall 23 located between two adjacent nut accommodating portions 21 is common to both nut accommodating portions 21 and defines a partition wall 24 partitioning the two nuts 10 in the nut accommodating portions 21. A part of the surrounding wall other than the partition wall 24 defines an outer surrounding wall 23A. As shown in FIG. 9, the height of the partition wall 24 is about twice the height of the outer surrounding walls 23A to ensure a creepage distance between the two adjacent nuts 10. The partition walls 24 are higher than the busbars placed on the upper fastening surfaces 10A of the nuts 10. Thus, the busbars cannot contact each other to be short-circuited due to lateral movements of the busbars placed on the nuts 10.

Positioning ribs 25 are provided on the inner peripheral surface of the surrounding wall 23 and project in to the nut accommodating portion 21 so that projecting ends of the positioning ribs 25 can contact the side surfaces of the nut 10 accommodated in the nut accommodating portion 21. The positioning ribs 25 of the outer surrounding wall 23A extend substantially straight up from the bottom plate 22 and continue over substantially the entire height of the outer surrounding wall 23A. The positioning ribs 25 on the partition wall 24 extend substantially straight up from the bottom plate 22 to a substantially vertical central of the partition wall 24.

As shown in FIG. 8, two positioning ribs 25 are provided at positions somewhat shifted toward a center from the opposite horizontal sides of the each surface of the surrounding wall 23. Further, a third positioning rib 25 is provided in a center position at each shorter side of the surrounding wall 23 of the larger nut accommodating portion 21B. Thus, each larger nut accommodating portion 21B has ten positioning ribs 25 while each smaller nut accommodating portion 21A has eight positioning ribs 25. The eight or ten positioning ribs 25 accurately position the nuts 10 horizontally in the nut accommodating portions 21 as shown in FIG. 14.

A substantially cylindrical bolt escaping recess 26 extends down into a substantially central part of the upper surface 22A of the bottom plate 22 in each nut accommodating portion 21, as shown in FIGS. 5 and 8-10. Each bolt escaping recess 26 has a cylindrical side wall and a bottom wall that have thicknesses substantially equal to the thickness of the bottom plate 22. As shown in FIGS. 9 and 10, each bolt escaping recess 26 has a substantially has a cylindrical outer surface projecting down from the lower surface 22B of the bottom plate 22.

As shown in FIG. 5, the bolt escaping recesses 26 are substantially coaxial with the respective bolt tightening holes 11 of the nuts 10 and have inner diameters slightly larger than the bolt tightening holes 11. Thus, the nut 10 will not interfere with the bottom plate 22 of the insulating plate 20 and the insulating plate 20 will not be broken by the bolt as the bolt is screwed into the nut 10 and inserted through the bolt tightening hole 11.

Figure 11:
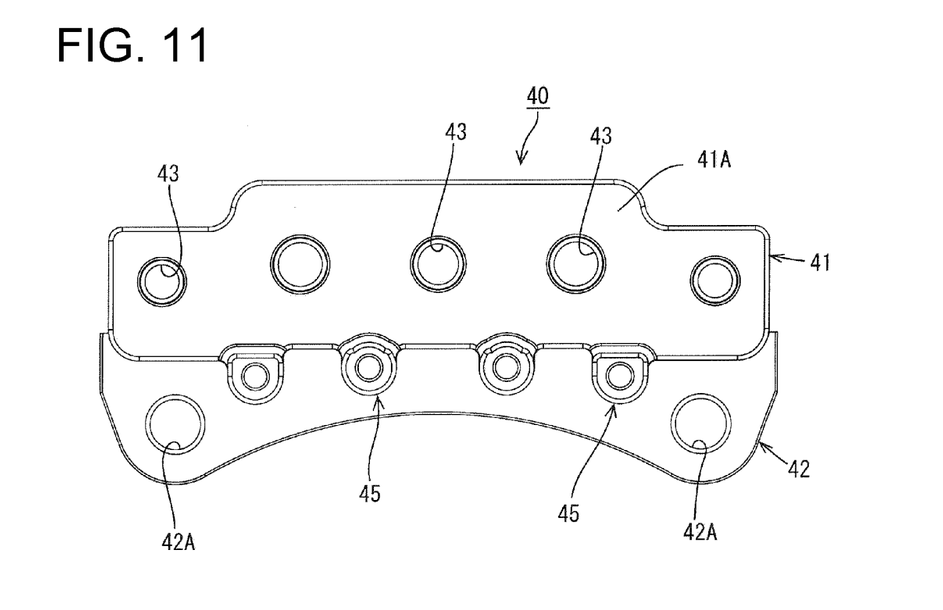
FIG. 11 is a plan view of a heat sink.

The heat sink 40 is shown in FIG. 11 and is produced of a material having a higher heat capacity than the remaining parts of the terminal block, such as die-cast aluminum. The heat sink 40 includes a sink main body 41 on which the insulating plate 20 is to be placed, and a fixing portion 42 unitary with the sink main body 41. The sink main body 41 is laterally long and the fixing portion 42 projects from one longer side edge of the sink main body 41.

The insulating plate 20 is placed on an upper surface 41A of the sink main body 41. Further, the upper surface 41A of the sink main body 41 is flat and/or polished to have no irregularities. Thus, the lower surface 22B of the bottom plate 22 of the insulating plate 20 can be held in close contact with the upper surface 41A of the sink main body 41, as shown in FIG. 5.

The sink main body 41 is formed with five accommodation recesses 43 arranged at substantially equal intervals in the lateral direction. The accommodation recesses 43 define substantially circular openings in the upper surface 41A of the sink main body 41 and are bottomed recesses that extend down into the upper surface 41A of the sink main body 41, as shown in FIG. 5. The accommodation recesses 43 are formed so that the bolt escaping recesses 26 of the insulating plate 20 can nest therein. More particularly, the bolt escaping recesses 26 are fit in the accommodation recesses 43 with small clearances between the outer surfaces of the bolt escaping recesses 26 and the inner peripheral surfaces of the accommodation recesses 43. Thus, the insulating plate 20 and the heat sink 40 can be assembled and positioned with respect to each other by fitting the bolt escaping recesses 26 of the insulating plate 20 into the corresponding accommodation recesses 43. Note that the bolt escaping recesses 26 and the accommodation recesses 43 define a second positioning means.

Figure 12:
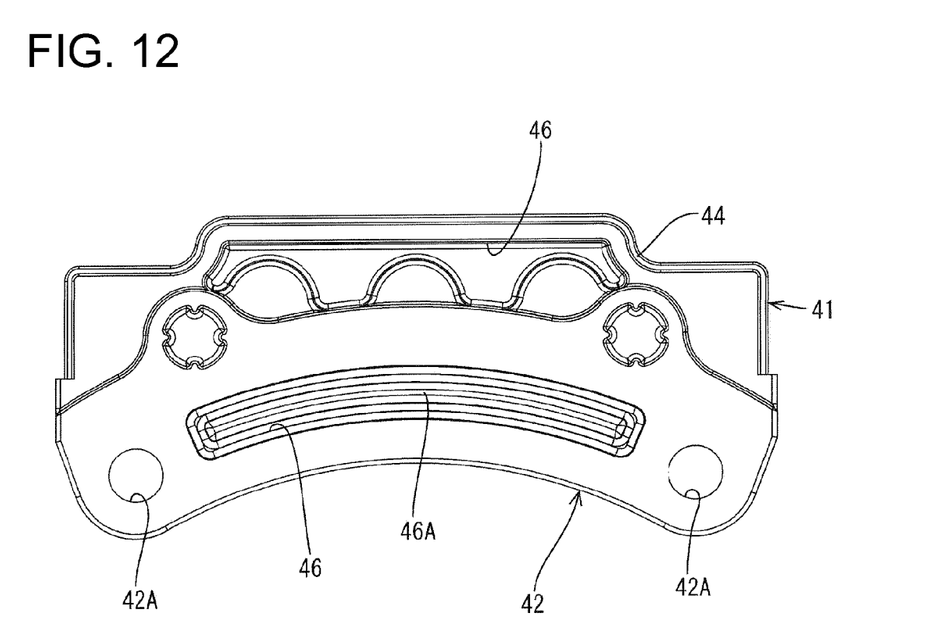
FIG. 12 is a bottom view of the heat sink.

An outer edge step 44 is formed at the outer peripheral edge of a lower end of the sink main body 41 and is above the lower surface of the sink main body 41. As shown in FIG. 12, this outer edge step 44 is formed over all of the outer peripheral edge except at a connected part of the sink main body 41 to the fixing portion 42.

Figure 6:
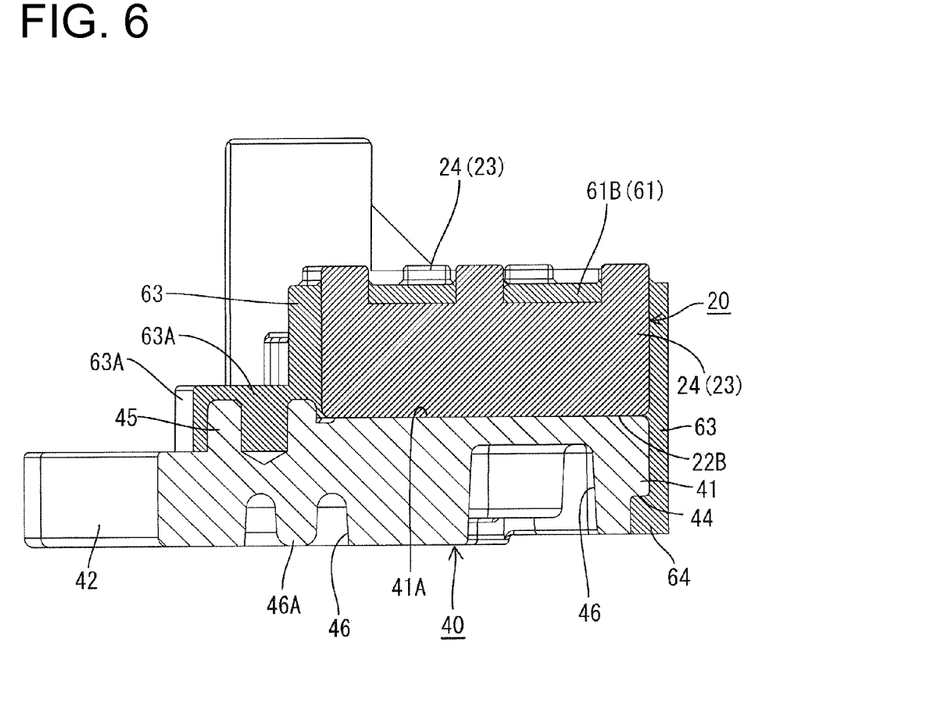
FIG. 6 is a section along VI-VI of FIG. 2.

The fixing portion 42 is laterally long along the side surface of the sink main body 41. Bolt insertion holes 42A vertically penetrate opposite lateral sides of the fixing portion 42. Substantially cylindrical projections 45 extend vertically from the upper surface of the fixing portion 42. As shown in FIG. 6, the cylindrical projections 45 are connected to the side surface of the sink main body 41 facing the fixing portion 42, and extend up to a position slightly above the upper surface 41A of the sink main body 41. Each cylindrical projection 45 defines a bottomed recess with an open upper end, as shown in FIG. 11.

As shown in FIG. 12, recesses 46 are formed in the lower surfaces of the sink main body 41 and/or the fixing portion 42. The recesses 46 form at least one heat radiation fin 46A in the fixing portion 42, and cooling water or fluid may be circulated to contact the fin 46A. The recess 46 and the heat radiation fin 46A increase the surface area of the lower surface of the heat sink 40 and thus improve a heat radiation property from the heat sink 40.

Figure 1:
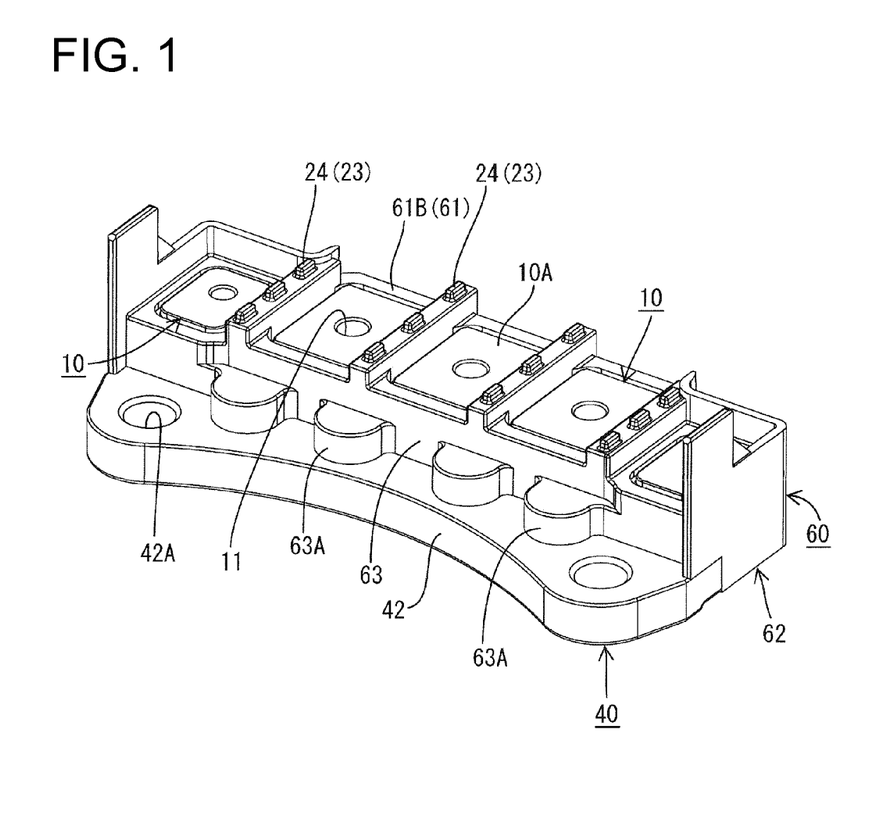
FIG. 1 is a perspective view of a terminal block according to an embodiment.
Figure 3:
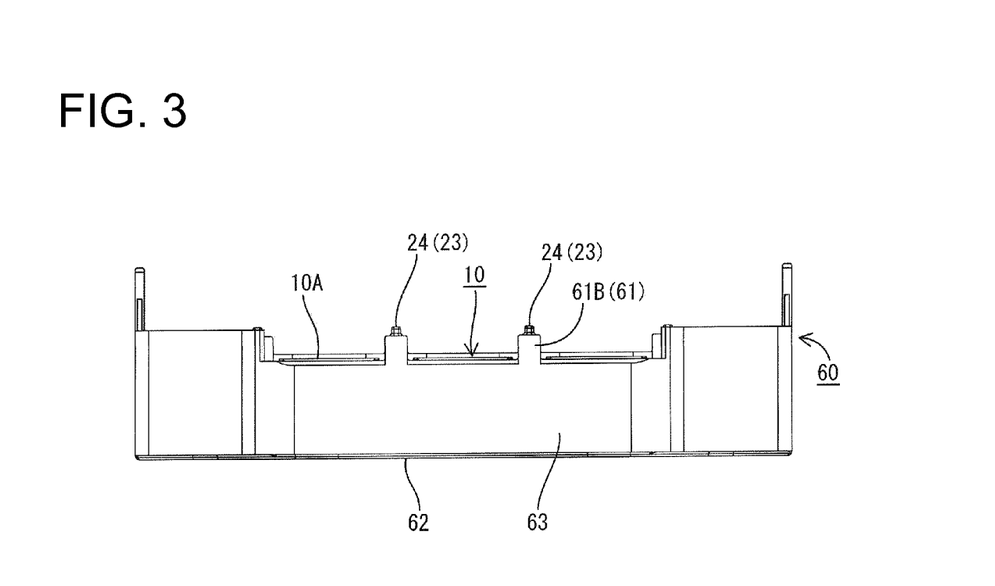
FIG. 3 is a rear view of the terminal block.

The molded resin part 60 is made unitarily e.g. of synthetic resin and, as shown in FIGS. 1, 3 and 5, partly covers the nuts 10, the insulating plate 20 and the heat sink 40 that have been assembled with each other. The molded resin part 60 includes an upper cover 61 that closely contacts the steps 12 of the nuts 10 and the upper ends of the surrounding walls 23 of the insulating plate 20, a lower cover 62 that closely contacts the outer edge step 44 of the heat sink 40, and a side wall 63 that closely contacts the insulating plate 20 and the outer side surfaces of the sink main body 41 of the heat sink 40. Thus, the side wall 63 unitarily joins the upper and lower covers 61, 62.

As shown in FIG. 5, the upper cover 61 includes nut covers 61A that cover the outer peripheral edges of the steps 12 of the respective nuts 10 over substantially the entire peripheries and surrounding wall covers 61B that cover the upper ends of the surrounding walls 23 except at parts of the partition walls 24. The nut covers 61A and the surrounding wall covers 61B are formed unitarily.

Figure 4:
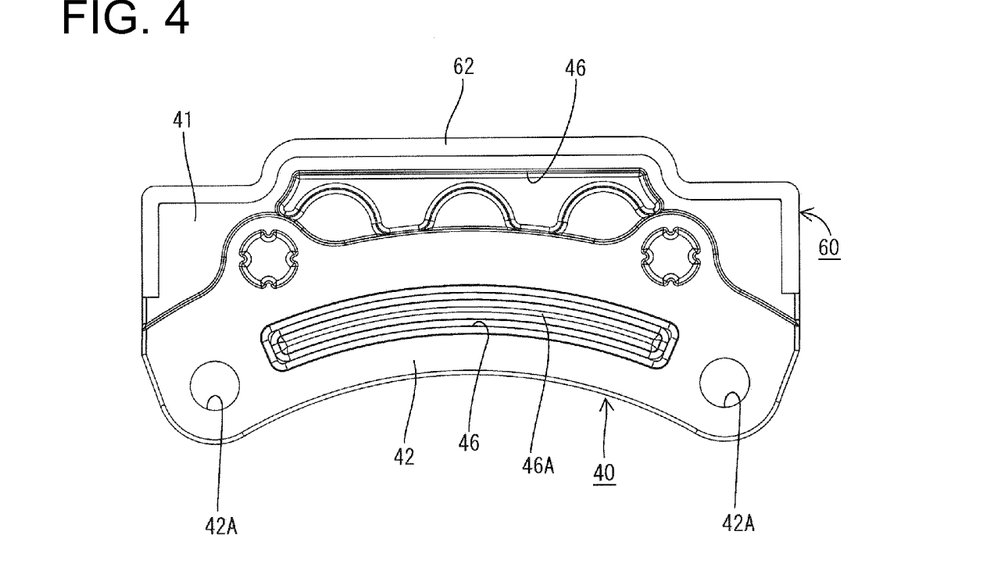
FIG. 4 is a bottom view of the terminal block.

As shown in FIGS. 4 and 5, the lower cover 62 covers the outer edge step 44 of the sink main body 41 of the heat sink 40 over the entire range from below. In this way, the molded resin part 60 vertically sandwiches the nuts 10, the insulating plate 20 and the heat sink 40 and hold the respective members 10, 20 and 40 in close contact with each other, as shown in FIGS. 5 and 6.

The upper cover 61 also substantially fills the clearances between the inner peripheral surfaces of the surrounding walls 23 of the nut accommodating portions 21 and the side surfaces of the nuts 10, thereby improving a degree of adhesion between the molded resin part 60, the nuts 10 and the insulating plate 20.

As shown in FIGS. 3 and 5, the side wall 63 entirely covers the side surfaces of the insulating plate 20 and the side surfaces of the sink main body 41 of the heat sink 40 between the upper and lower covers 61 and 62. As shown in FIG. 6, the side wall 63 has projection covers 63A that cover the cylindrical projections 45 of the heat sink 40. The projection covers 63A fill up the interiors of the cylindrical projections 45 and entirely cover the upper and side surfaces of the cylindrical projections 45, thereby improving a degree of adhesion between the molded resin part 60 and the heat sink 40.

Figure 15:
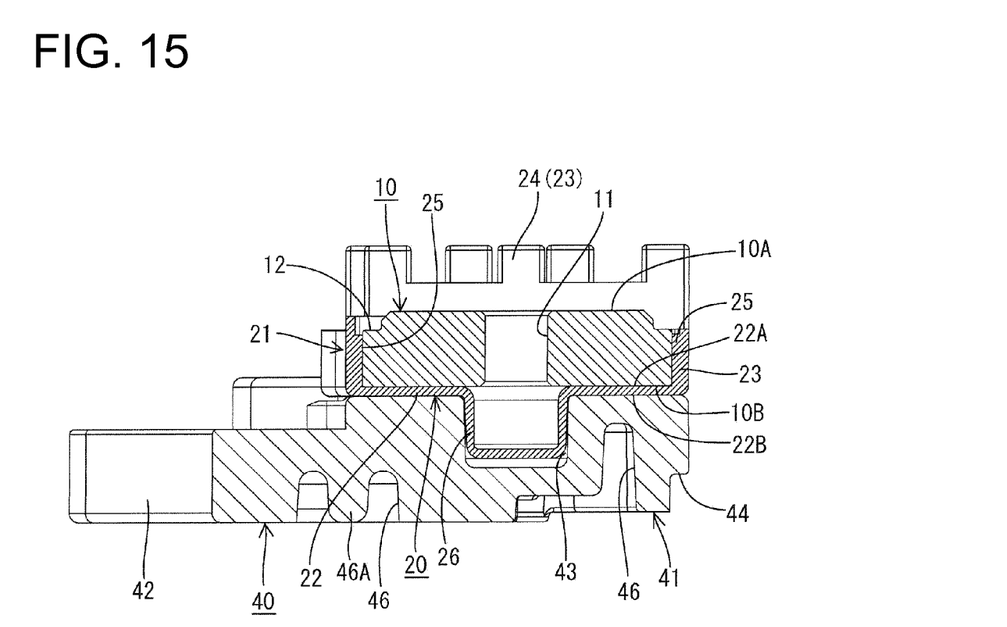
FIG. 15 is a section along XV-XV of FIG. 14.

The terminal block is assembled by initially placing the nuts 10 in the respective nut accommodating portions 21 of the insulating plate 20 and fitting the bolt escaping recesses 26 of the nut accommodating portions 21 into the respective accommodation recesses 43 of the heat sink 40. The nuts 10, the insulating plate 20 and the heat sink 40 that have been assembled, as shown in FIGS. 14 and 15, then are set in first and second molds 71, 72. The properly positioned nuts 10, insulating plate 20 and heat sink 40 can be set in the first and second molds 71, 72 without being displaced. Note that the heat sink 40 is positioned in the second mold 72 by inserting a positioning projection 72A of the second mold 72 into the recess 46 of the heat sink 40, as shown in FIG. 16.

The insulating plate 20 is positioned on the heat sink 40 and the nuts 10 are positioned on the insulating plate 20. Thus, the positioning pins 71A of the first mold 71 are inserted accurately into the bolt tightening holes 11 of the nuts 10 from above to avoid breaking the nuts 10 and/or the positioning pins 71A as the first and second molds 71, 72 are closed. The nuts 10 are accommodated in a slightly loose state in the nut accommodating portions 21 before being fixed by the positioning pins 71A. Additionally, the upper inner peripheral edges of the bolt tightening holes 11 of the nuts 10 have tapered surfaces 11A that engage inclined surfaces 71B of the positioning pins 71A, as shown in FIG. 16, to generate slight relative corrective displacements of the positioning pins 71A and the bolt tightening holes 11 of the nuts 10 as the first and second molds 71, 72 are closed.

The resin engaging portions 73 in the first mold 71 press the steps 12 of the nuts 10 over the entire peripheries from above and the lower surface of the heat sink 40 is supported by the second mold 72. As a result, the bottom plate 22 in the nut accommodating portions 21 of the insulating plate 20 is sandwiched vertically between the lower fastening surfaces 10B of the nuts 10 and the upper surface 41A of the sink main body 41 of the heat sink 40 to hold the nuts 10, the heat sink 40 and the bottom plate 22 in close contact.

Figure 16:
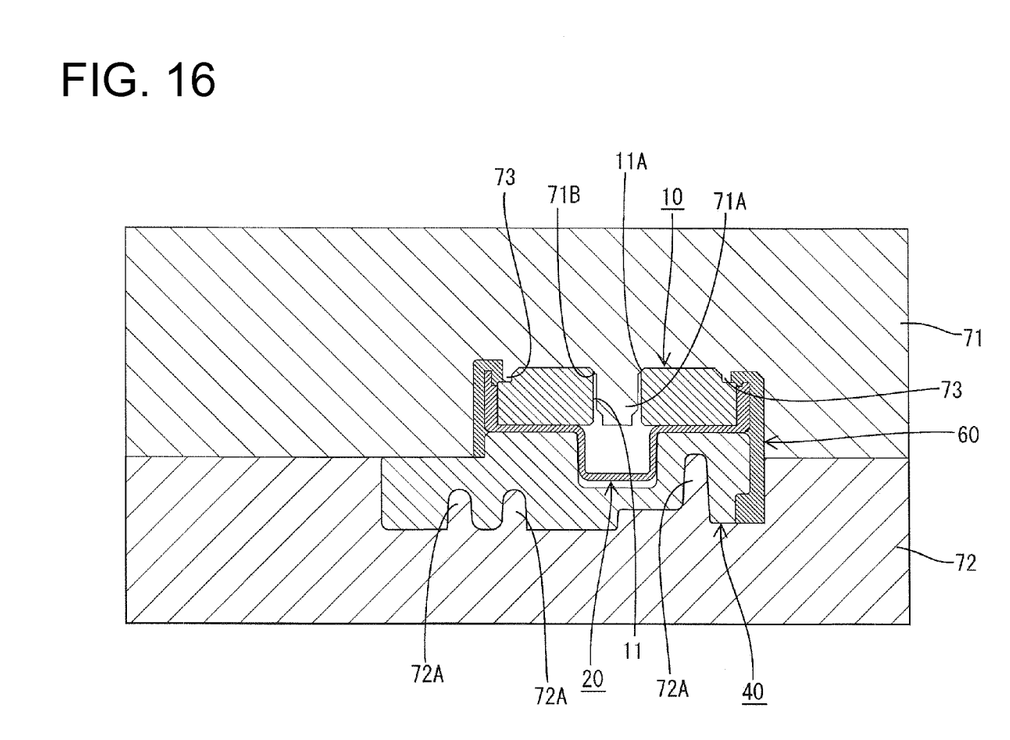
FIG. 16 is a section showing a terminal block molded in first and second molds.

Synthetic resin then is injected into a cavity formed by the first and second molds 71, 72 to form the molded resin part 60 as shown in FIG. 16. At this time, the side surfaces of the nuts 10 are contacted only by the positioning ribs 25 on the inner peripheral surfaces of the surrounding walls 23 of the insulating plate 20, and clearances are formed between the inner surfaces of the surrounding walls 23 and the side surfaces of the nuts 10 and the synthetic resin can flow into these clearances. Hence, the nuts 10, the insulating plate 20 and the molded resin part 60 are held in close contact, and the nuts 10 and the insulating plate 20 are fixed without any chance of backlash.

Finally, the first and second molds 71, 72 are opened vertically to complete the terminal block.

As described above, the terminal block is formed by the unitary molded resin part 60 with the nuts 10, the insulating plate 20 and the heat sink 40 positioned respectively at correct positions. Thus, an insulating property between the nuts 10 and the heat sink 40 can be ensured reliably.

Molding particularly is performed with the nuts 10, the insulating plate 20 and the heat sink 40 held in close contact. Thus, the nuts 10, the insulating plate 20 and the heat sink 40 remain in close contact after molding. That is, the terminal block can be formed without any air layers at boundaries between the nuts 10 and the insulating plate 20 or at a boundary between the insulating plate 20 and the heat sink 40. Therefore, heat can be transferred quickly from the nuts 10 to the heat sink 40 and heat radiation performance of the terminal block is improved when the nuts 10 receive heat from the busbars.

The nuts 10, the insulating plate 20 and the heat sink 40 are sandwiched vertically and held in close contact by the molded resin part 60. Accordingly, the heat transfer performance from the nuts 10 to the heat sink 40 can be improved with the insulating property ensured between the nuts 10 and the heat sink 40.

The invention is not limited to the above described and illustrated embodiment. For example, the following embodiments also are included in the scope of the invention.

The side surfaces of each nut 10 are covered over the entire periphery by the surrounding wall 23 of the nut accommodating portion 21 in this embodiment. However, the surrounding wall may have a plurality of walls intermittently arranged around the nut.

The second positioning means is formed by fitting the bolt escaping recesses 26 of the insulating plate 20 into the accommodation recesses 43 of the heat sink 40 in this embodiment. However, the invention is not limited to such a mode. For example, the second positioning means may be formed by providing a projection on the bottom plate 22 of the insulating plate 20 and fitting this projection into a recess in the heat sink 40.

The first positioning means is formed by accommodating the nuts 10 into the nut accommodating portions 21 of the insulating plate 20 in this embodiment. However, the first positioning means may be formed by providing the bottom plate 22 of the insulating plate 20 with projections that contact with the four side surfaces of the nuts 10 and bringing the side surfaces of the nuts 10 into contact with the projections.

The nuts 10 are positioned more accurately with respect to the nut accommodating portions 21 by providing the positioning ribs 25 on the inner peripheral surfaces of the surrounding walls 23. However, the nuts 10 may be positioned more accurately with respect to the nut accommodating portions 21 by narrowing clearances between the inner peripheral surfaces of the surrounding walls 23 and the side surfaces of the nuts 10.

What is claimed is:

1. A terminal block in which conductors extending from devices are to be placed one over another and fastened by a bolt, comprising:
   at least one nut having an upper surface on which the conductors are to be placed and a lower surface opposite the upper surface;
   at least one insulating plate closely contacting the lower surface of the nut;
   at least one heat sink closely contacting a surface of the insulating plate opposite the nut;
   at least one first positioning means for positioning the nut and the insulating plate with respect to each other;
   at least one second positioning means for positioning the insulating plate and the heat sink with respect to each other; and
   an integral molded resin part formed around the nut, the insulating plate and the heat sink.

2. The terminal block of claim 1, wherein the first positioning means comprises a nut accommodating portion formed in the insulating plate for accommodating the nut.

3. The terminal block of claim 2, wherein the nut accommodating portion includes a bottom plate sandwiched between and closely contacting the nut and the heat sink and at least one surrounding wall standing up from the bottom plate to at least partly surround side surfaces of the nut.

4. The terminal block of claim 3, further comprising positioning ribs on the inner surface of the surrounding wall and closely contact the side surfaces of the nut.

5. The terminal block of claim 4, wherein the positioning ribs are formed to reinforce the surrounding wall over substantially an entire height thereof.

6. The terminal block of claim 4, wherein the surrounding wall has an inner peripheral shape substantially conforming to an outer peripheral shape of the nut.

7. The terminal block of claim 1, wherein the second positioning means comprises a projection on the insulating plate fit into an accommodation recess in the heat sink.

8. The terminal block of claim 7, wherein the projection of the insulating plate defines at least one bolt escaping recess that is substantially coaxial with a bolt tightening hole in the nut and recessed away from the nut.

9. The terminal block of claim 1, wherein:
the at least one nut comprises a plurality of nuts accommodated in a nut accommodating portion; and
at least one partition wall is provided between the nuts so that the nuts can be accommodated individually.

10. The terminal block of claim 9, wherein the partition wall projects higher than the conductors placed on the nuts.

11. The terminal block of claim 9, wherein a height of the partition wall is more than about 1.5 times the height of outer surrounding walls standing upward from the bottom plate of the nut accommodating portion.

12. The terminal block of claim 1, wherein the insulating plate includes a plurality of nut accommodating portions capable of accommodating a plurality of nuts and one unitary bottom plate is provided common to all the nut accommodating portions, wherein opposite surfaces of the bottom plate are formed to be flat.

13. A terminal block in which conductors extending from devices are to be placed one over another and fastened by a bolt, comprising:

at least one nut having a first surface on which the conductors are to be placed, a second surface opposite the first surface and a bolt tightening hole extending between the first and second surfaces;

an insulating plate with a nut accommodating portion having a bottom panel closely contacting the second surface of the nut, at least one surrounding wall standing up from the bottom panel and at least partly surrounding side surfaces of the nut for positioning the nut in the nut accommodating portion and a hollow bolt escape receptacle with a concave side aligned coaxially with the bolt tightening hole and a convex side projecting away from the nut;

a heat sink closely contacting a surface of the bottom panel of the insulating plate opposite the nut, an accommodation recess in the heat sink engaging the convex side of the bolt escape receptacle; and a unitary matrix of synthetic resin surrounding at least parts of the nut, the insulating plate and the heat sink and holding the nut, the insulating plate and the heat sink in an assembled condition.

14. The terminal block of claim 13, wherein the synthetic resin engages an outer peripheral part of the first surface of the nut and a part of the surface of the heat sink facing away from the nut.

15. The terminal block of claim 13, further comprising positioning ribs on the inner surface of the surrounding wall and closely contact the side surfaces of the nut.

16. The terminal block of claim 15, wherein the positioning ribs are formed to reinforce the surrounding wall over substantially an entire height thereof.

17. The terminal block of claim 16, wherein the surrounding wall has an inner peripheral shape substantially conforming to an outer peripheral shape of the nut.

* * * * *